(12) United States Patent
Schoetz et al.

(10) Patent No.: US 9,296,639 B2
(45) Date of Patent: Mar. 29, 2016

(54) METHOD FOR PRODUCING AN OPTICAL PREFORM WITH A POD CLADDING GLASS LAYER

(71) Applicant: Heraeus Quarzglas GmbH & Co. KG, Hanau (DE)

(72) Inventors: Gerhard Schoetz, Aschaffenburg (DE); Karsten Bräuer, Bruchköbel (DE); Richard Schmidt, Hammersbach (DE); Peter Bauer, Seligenstadt (DE); Andreas Schultheis, Langenselbold (DE); Paul Bödiger, Rodenbach (DE); Andreas Langner, Freigericht (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 14/420,572

(22) PCT Filed: Aug. 8, 2013

(86) PCT No.: PCT/EP2013/066624
§ 371 (c)(1),
(2) Date: Feb. 9, 2015

(87) PCT Pub. No.: WO2014/023799
PCT Pub. Date: Feb. 13, 2014

(65) Prior Publication Data
US 2015/0218036 A1    Aug. 6, 2015

(30) Foreign Application Priority Data
Aug. 9, 2012  (DE) .................. 10 2012 107 344

(51) Int. Cl.
*C03B 37/012*    (2006.01)
(52) U.S. Cl.
CPC ....... *C03B 37/01291* (2013.01); *C03B 2201/12* (2013.01); *C03B 2203/12* (2013.01)

(58) Field of Classification Search
USPC .................................................. 65/386, 391
IPC ...................................................... C03B 37/012
See application file for complete search history.

(56) References Cited

U.S. PATENT DOCUMENTS

| | | |
|---|---|---|
| 4,859,223 A | 8/1989 | Kajioka et al. |
| 2003/0031444 A1 | 2/2003 | Croteau et al. |

(Continued)

FOREIGN PATENT DOCUMENTS

| | | |
|---|---|---|
| DE | 10 2009 004 756 A1 | 2/2011 |
| EP | 1997783 A2 | 5/2008 |
| FR | 2950621 A1 | 4/2011 |

OTHER PUBLICATIONS

Espacenet English-Language Abstract of FR 2950621 A1, published Feb. 10, 2011.

(Continued)

*Primary Examiner* — Mark Halpern
(74) *Attorney, Agent, or Firm* — Tiajoloff and Kelly LLP

(57) ABSTRACT

The invention relates to a plasma deposition process for producing an optical preform, which is characterized by a cladding glass layer having a non-round internal cross-section together with high fluorine doping and axially and radially specified dopant distribution, which in the simplest case is as uniform as possible. For this purpose, a two-stage method is proposed, wherein a substrate body having a non-round cross-section is first reshaped into a coated substrate body having a circular cross-section in that a POD filling layer made of quartz glass having the nominal fluorine concentration is deposited onto a present filling surface and rounded by grinding, and then in the second stage of the method a POD sheathing glass layer made of fluorine-doped quartz glass and having a circular-ring-shaped cross-section is deposited.

9 Claims, 2 Drawing Sheets

(56) References Cited

U.S. PATENT DOCUMENTS

| | | | | |
|---|---|---|---|---|
| 2006/0088261 | A1* | 4/2006 | Berkey | C03B 37/01234 385/123 |
| 2007/0177846 | A1* | 8/2007 | Chen | C03B 37/01217 385/125 |
| 2007/0266738 | A1* | 11/2007 | Gallagher | C03B 37/01211 65/393 |
| 2008/0295541 | A1 | 12/2008 | Otosaka | |
| 2010/0162768 | A1* | 7/2010 | Otosaka | C03B 37/01426 65/391 |
| 2010/0162769 | A1* | 7/2010 | Otosaka | C03B 37/01426 65/391 |
| 2014/0208802 | A1* | 7/2014 | Schultheis | C03B 37/0148 65/391 |
| 2015/0017440 | A1* | 1/2015 | Schotz | C03B 37/01211 428/376 |

OTHER PUBLICATIONS

Espacenet English-Language Abstract of DE 10 2009 004 756 A1, published Apr. 1, 2011.

\* cited by examiner

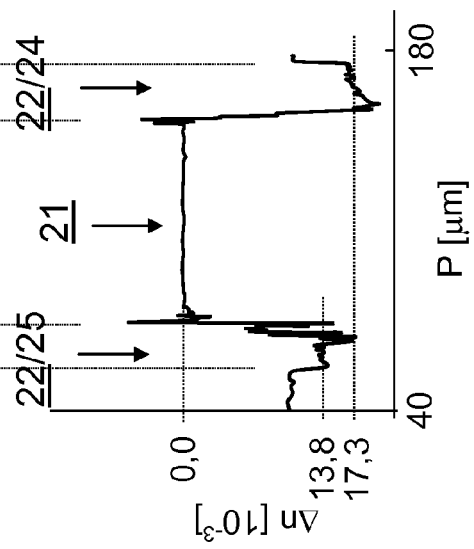
Fig. 2
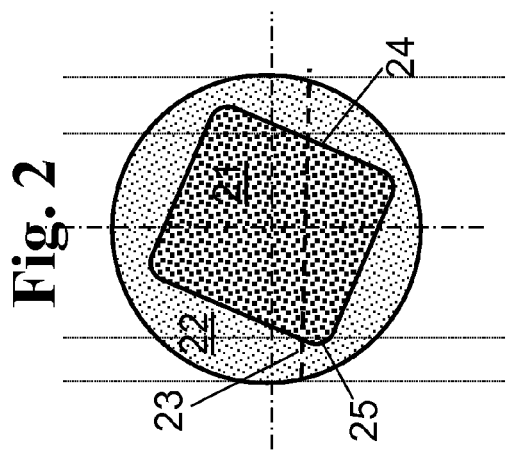
Fig. 3
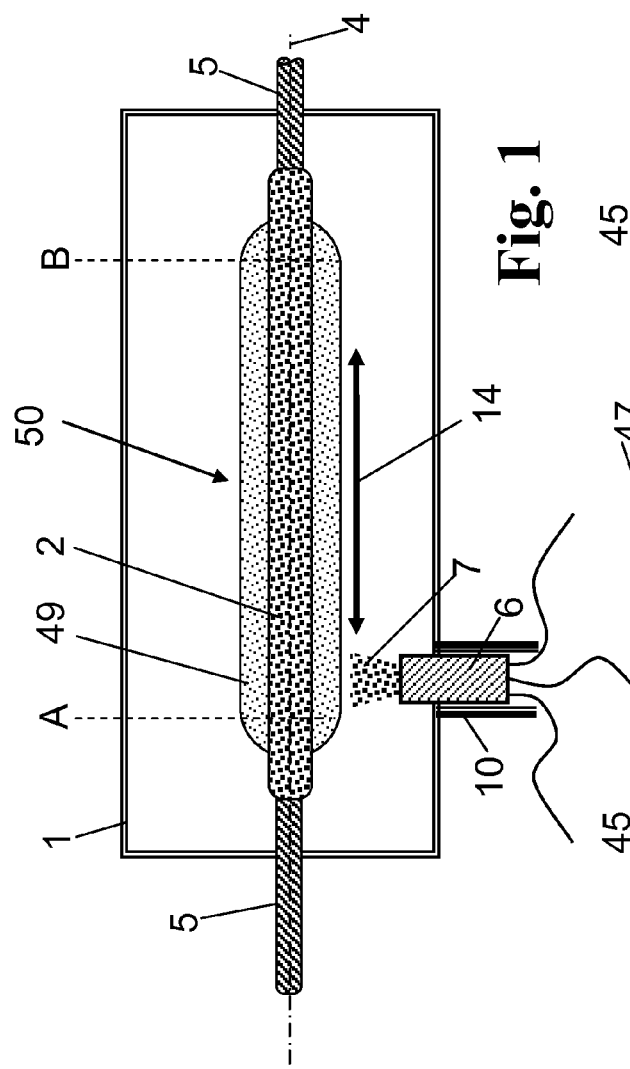
Fig. 1
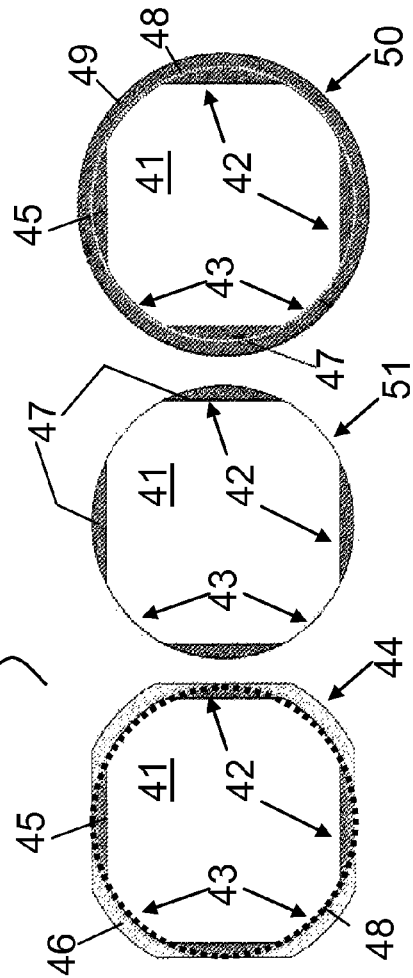
Fig. 4
Fig. 5
Fig. 6

METHOD FOR PRODUCING AN OPTICAL PREFORM WITH A POD CLADDING GLASS LAYER

This application is a U.S. national stage under 35 U.S.C. §371 of international application Ser. No. PCT/EP2013/066624 filed 8 Aug. 2013.

TECHNICAL BACKGROUND

The present invention refers to a method for producing an optical preform with a POD cladding glass layer of fluorine-doped quartz glass comprising forming $SiO_2$ particles by means of a plasma burner in the presence of fluorine, depositing said particles on an outer cylinder surface of a cylindrical substrate body having a longitudinal axis, and directly vitrifying said particles, said substrate body when viewed in the direction of the longitudinal axis thereof having a non-round cross-section including at least one surface section that extends between support points of an enveloping circle and which has either no curvature or a curvature which is different from the curvature of the enveloping circle.

The optical preform is directly drawn into an optical fiber or it serves as a rod-shaped or tubular preliminary product for fiber production. In radial direction, it has a non-homogeneous refractive index profile which is also defined by the fluorine doping of the cladding glass layer.

Cross sections differing from a circular form effect a change in the light conduction in optical components; to be more specific, light modes (so-called helix modes) are thereby hindered and changed, which permits a more efficient injection of pump light into the laser-active core in the case of laser applications.

PRIOR ART

A standard POD (plasma outside deposition) method for producing a preform is e.g. described in EP 1 997 793 A2. A cladding glass layer of fluorine-doped quartz glass is here produced on the outer cylinder jacket of a core rod of quartz glass. Such a layer is here and in the following designated as a "POD cladding glass layer". For producing the POD cladding glass layer a plasma burner is fed with a silicon compound, oxygen and a fluorine compound, the plasma burner being reversingly moved along the core rod rotating about its longitudinal axis. Fluorine-doped $SiO_2$ which is deposited layer by layer on the core glass and is thereby directly vitrified while forming the fluorine-containing $SiO_2$ cladding glass layer is formed by reaction of the start substances in the plasma flame.

As a rule, the core rod has a radially homogeneous refractive-index profile. It mostly consists of undoped quartz glass, but may also contain dopants changing the refractive index. The fluorine doping of the cladding glass layer leads to a decrease in the refractive index as compared with undoped quartz glass and thus to a refractive index difference $\Delta n$ between the core glass and the cladding glass. A considerable decrease in the refractive index requires high fluorine doping. This is accomplished by vitrifying the cladding glass directly during deposition, and the easily diffusing fluorine is thereby enclosed in the quartz glass.

It is known that the fluorine doping degree depends on the surface temperature of the core rod and is decreasing with an increasing temperature. A change in the temperature during the deposition process may therefore lead to inhomogeneous fluorine doping of the cladding glass layer. The effect of the surface temperature on the fluorine doping degree can be noticed in core rods (and generally in substrate bodies) with a non-round cross-section.

An azimuthal variation of the temperature on the core rod surface thereby occurs—either due to the distances that are different during the rotating buildup between core rod surface and plasma burner or due to other heating-up effects. This has impacts on both the fluorine doping degree and the fusion of the $SiO_2$ particles deposited on the surface.

For instance, the surface temperature during the coating of a core rod with a D-shaped cross-sectional area is much smaller on the flattening than on the rounding. On the flattening more fluorine is therefore incorporated into the glass matrix than on the rounding, so that the fluorine-doped quartz glass deposited on the flattening has a smaller refractive-index than the quartz glass deposited on the rounding. As a consequence, this leads to an azimuthal refractive-index variation which corresponds to the azimuthally varying fluorine content of the deposited quartz glass layer or that of the azimuthally varying surface temperature during coating.

Moreover, due to the lower temperature in the area of the flattening, there is the risk that the deposited $SiO_2$ is not fully fused, resulting in the possible formation of bubbles. Therefore, the POD process parameters of relevance to the surface temperature, such as performance and gas flows, must be constantly changed and adapted such that the deposited $SiO_2$ particles will also be fused in the area of the flattening.

That is why the conclusion is drawn in DE 10 2009 004 756 A1 that the POD method is not suitable in the case of substrate bodies having deviations from the circular cylinder geometry—especially in the case of rods having a rectangular cross-section—because upon rotation of said substrate bodies around their longitudinal axis the distance between plasma burner and substrate body surface is permanently changing to such a strong degree that different deposition conditions and deposition temperatures occur causing an inhomogeneous deposition of the POD cladding glass layer.

The solution to these problems is seen in an overcladding technique. Preferably, a prefabricated cladding glass tube of fluorine-doped quartz glass is pre-collapsed onto a mandrel, so that the inner form thereof is already adapted to the rectangular shape of the core rod to be overclad, and a predetermined gap dimension range between 1 mm and 3 mm can be adhered to during overcladding. Upon collapsing of the cladding class tube which has been pre-collapsed into a rectangular shape, a vacuum is produced in the gap between core rod with the dimensions 15.9×5.8 mm and fluorine-doped cladding glass tube, so that the softened cladding glass can flow both in radial and in azimuthal direction.

This combination of deposition technique and overcladding technique for producing the cladding glass layer requires, however, several additional process steps and is time-consuming and expensive. Moreover, it is difficult to guarantee a constantly high quality of the boundary surface between core rod and collapsed cladding glass tube.

U.S. Pat. No. 4,859,233 A further discloses the production of an optical preform, wherein a non-round substrate body of germanium- or fluorine-doped quartz glass has deposited thereon an also fluorine-doped cladding-glass soot layer by means of VAD (vapor phase axial deposition) or OCVD (outside chemical vapor deposition) methods and said cladding-glass soot layer is subsequently sintered. The substrate body has a "double-D shape", i.e. two opposite planar surfaces and two slightly convexly curved surfaces. The soot layer envelopes said non-round substrate body in cylindrical form with a circular round cross-section. During sintering the jacket layer more or less adapts itself to the shape of the substrate body, so that the preform has either an approximately oval cross-section, or clearly shows a "double-D-shape" conforming to the cross section of the substrate body, which double-D shape is worked out even more distinctly by grinding the two planar surfaces.

The manufacturing conditions during direct vitrification (POD method) differ substantially from those with soot deposition and subsequent vitrification (VAD or OCVD method), especially with respect to the effect of the surface temperature of the substrate body on the homogeneity of the fluorine doping in the cladding glass layer.

TECHNICAL OBJECTIVE

So far the above-described azimuthal variations of the refractive index occur in the production of cladding glass layers on non-round substrate bodies by way of a POD method.

The POD method is as such particularly well suited for applying layers of quartz glass with a high concentration of dopant and with a high quality of the boundary surface to a substrate body. It is therefore desired that this method can also be used for producing cladding glass layers on substrate bodies with a non-round cross-section.

It is thus the object of the present invention to indicate a method for producing a preform which is distinguished by a cladding glass layer having a non-round inner cross-section with high fluorine doping and axially and radially predetermined dopant distribution that in the simplest case is as uniform as possible, and in the case of which the risk of failure due to high mechanical stresses and the risk of the formation of bubbles due to different surface temperatures of the substrate body in the deposition process is reduced.

GENERAL DESCRIPTION OF THE INVENTION

This object, starting from the aforementioned method, is achieved according to the invention in that the production of the POD cladding glass layer comprises the following method steps:
(a) producing a POD filling layer of quartz glass with a fluorine nominal concentration onto said surface section, so as to form a coated substrate body, said coated substrate body has a circular round cross-section having a radius that is at least as great as the radius of the enveloping circle; and
(b) depositing a POD enveloping glass layer of circular round cross-section and of fluorine-doped quartz glass on the coated substrate body.

The substrate body with non-round cross-section has at least one surface section that is either flat or has a curvature which differs from that of the enveloping circle insofar as its curvature is curved to a smaller or greater degree or has a sign differing from that of the curvature of the fictive enveloping circle around the support points between which the surface section extends. For the sake of simplicity this surface section shall also briefly be designated as a "filling-up surface".

In the method according to the invention the POD cladding glass layer with the non-round inner cross-section is produced in two stages, each including a POD process.

In a first stage a POD filling layer is produced on the filling-up surface. The characteristic features of this filling layer are its chemical composition and its geometrical shape. It consists of quartz glass with a fluorine content corresponding to the nominal concentration, and it fills up the filling-up surface to such an extent that a circular round cross-section is obtained on the whole for the substrate body. Ideally, the radius of this circular round cross-section conforms exactly to the enveloping circle radius around the support points; it may however also be slightly greater or smaller.

In the second stage a cladding glass layer is produced in the customary way by means of a POD process on the substrate body which is then circularly coated. On account of the previously created roundness of the substrate body the problem caused by temperature differences on edges does not occur, so that a homogeneous fluorine doping in the cladding glass layer with circular round cross-section can be achieved without any difficulties.

Whenever the fluorine content of both the circular round POD cladding glass layer produced in the second stage and of the POD filling layer produced in the first stage conforms to the fluorine nominal concentration, one obtains, on the whole, a homogeneously doped POD enveloping glass layer produced by way of POD methods and applied to the substrate body, the POD enveloping glass layer having a non-round inner and a round outer cross-section.

POD filling layer and circular round POD enveloping glass layer jointly form the POD cladding glass layer. The fluorine concentration of the enveloping glass layer can be adapted to specific requirements. Even if the fluorine content of the enveloping glass layer differs from the fluorine nominal concentration, one achieves the advantage of a homogeneous and reproducibly producible fluorine doping within said two layers.

The production of the POD filling layer on the filling-up layer in the pre-stage preferably comprises the following method steps:
(aa) depositing a POD precursor layer from the quartz glass with the fluorine nominal concentration on the surface section;
(bb) removing the portions of the POD precursor layer projecting over the enveloping circle while forming the coated substrate body with circular round cross-section.

In the first step, a quartz glass layer doped with fluorine in the nominal concentration is produced on the filling-up surface by way of the POD deposition process, as has already been described. This POD precursor layer completely fills up the region from the substrate body surface to the enveloping circle, but may also extend beyond said region. The deposition process can be adapted in this first step to the deposition on the filling-up surface and optimized to the quality of the POD precursor layer, i.e. e.g. to the degree and homogeneity of the fluorine concentration. Since superfluous layer regions must be removed later, homogeneity and bubble formation in the regions to be removed later need not be taken into consideration.

It is also important that the POD precursor layer between the support points is adequately thick in the sense that a mechanical removal is possible in the subsequent second step, which produces a POD filling layer in the above-described sense from the POD precursor layer, resulting in the coated substrate body with round circular cross-section.

The removal of superfluous layer regions is carried out in the known manner mechanically by way of milling, grinding, polishing, or the like; ideally, all portions of the POD precursor layer projecting over the enveloping circle are removed. A portion of quartz glass with the fluorine nominal concentration is thereby produced over the filling-up surface, said portion being defined by a circular arc between the support points, and the radius thereof exactly conforming to the enveloping circle radius. Slightly greater or smaller radii are acceptable, with part of the substrate body around the support points being removed in the last-mentioned case.

Two different method variants have turned out to be advantageous for the deposition of the POD precursor layer on the filling-up surface according to method step (aa).

In the one variant it is intended that during deposition of the POD precursor layer the substrate body is continuously rotated about the longitudinal axis to deposit a surrounding POD precursor layer annularly enclosing the cylinder jacket of the substrate body.

The inner cross-section of the POD precursor layer produced thereby images the outer profile of the substrate body; it is thus in the form of a ring, but not in the form of a circle ring. It is here accepted that the fluorine content of the quartz glass e.g. in the area of the enveloping-circle support points is smaller—due to the elevated temperature prevailing there—than in the area of the filling-up surface. It is important that the quartz glass deposited on the filling-up surface has the fluorine concentration of the nominal concentration and is without bubbles. The deposition process is thereupon optimized, for in the second method step the quartz glass portions with the lower fluorine concentration are removed, so that there will only remain the POD filling layer over the filling-up surface between the support points.

In the other method variant, the POD precursor layer is exclusively or predominantly deposited on the surface section.

The $SiO_2$ particles are deposited and vitrified predominantly or exclusively for filling up the filling-up surface of the substrate body. This body is here either rotated in a direction along the plasma deposition burner, wherein the rotational speed in the area of the filling-up surface is slower than outside of said surface, or the substrate body is reversingly rotated back and forth in the area of the filling-up surface until the area of the filling-up surface is filled up between the support points, or the filling-up surface is filled up without any rotation of the substrate body about its longitudinal axis by POD deposition. In the case of plural filling-up surfaces each filling-up surface is treated one after the other in a corresponding manner.

In this procedure, too, excessive material must then be removed to obtain a coated substrate body with an exactly round cross-section. By comparison with the first-mentioned method variant, it has the advantage that a more selective filling up of the filling-up surface with less efforts and material loss is made possible in the subsequent removal.

As has already been mentioned, in method step (bb) all of the portions of the POD precursor layer that are projecting over the enveloping circle are removed.

The portions projecting over the enveloping circle impair either the ideal circle form of the substrate body, or they consist of quartz glass with a fluorine concentration below the nominal concentration. Ideally, exactly these superfluous portions are removed, so that a coated substrate body is obtained having an outer diameter exactly conforming to that of the enveloping circle.

The substrate body is normally a core rod, a preform for optical fibers or a substrate tube of doped or undoped quartz glass. The non-round cross section is e.g. oval, polygonal, particularly square, rectangular, hexagonal, octagonal or trapezoidal, grooved, blossom-shaped, star-shaped or it has planar surfaces or slightly inwardly (concavely) or outwardly (convexly) curved surfaces at one side or at plural (preferably opposite) sides, so that one or more filling-up surfaces are produced with respect to the circle form. For the designation of an embodiment with circle and a flat side, the term "D-shape" has been accepted. Derived from this, circle cross-sections with two or four opposite flat sides are also called "double-D shape" or "quadruple-D shape", respectively.

When a substrate body is used which, viewed in the direction of its longitudinal axis, has a polygonal cross-section, all of the corners of the polygon are preferably located on the enveloping circle.

Such a cross section of the core rod facilitates the production of the filling layer on the surface sections between the support points of the enveloping circle.

EMBODIMENT

The invention will now be explained in more detail with reference to embodiments and a patent drawing. In detail, FIG. 1 shows a device for producing a preform according to the POD method, in a schematic illustration;

FIG. 2 shows an optical fiber with a square core in a radial section;

FIG. 3 shows a scan of an IM-FTS refractive index analysis along the scan line plotted in FIG. 2;

FIGS. 4 to 6 show method steps for producing a preform on the basis of the method according to the invention, starting from a substrate body having a cross-section with quadruple D-shape.

Figure 7:
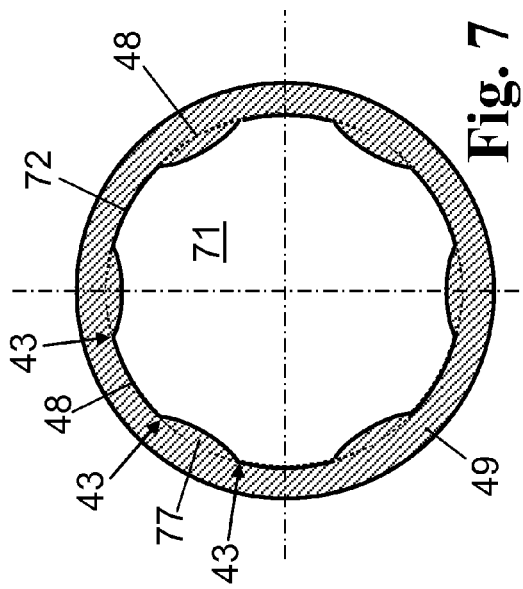
FIGS. 7 to 10 show cross-sections of different embodiments of optical preforms which can be obtained according to the method according to the invention.

FIG. 2 shows a cross section of an optical fiber. The fiber core 21 of undoped quartz glass, which is square when viewed in cross section, is surrounded by a fiber jacket 22 of fluorine-doped quartz glass which has a square inner cross-section and a round outer jacket. The side length of the fiber core 21 is 75 µm and the fiber diameter is 120 µm. The fluorine-doped quartz glass of the fiber jacket 22 has been produced by way of a traditional POD process performed on a square core rod.

The fiber has been subjected to a refractive index measurement by means of IM-FTS (Interference Microscopy+Fourier Transform Spectroscopy). These measurements show the azimuthal refractive-index variation in the fiber jacket 22. The refractive index variations are the greater the more the used core rod differs from the circle form. In FIG. 2, a scan line 23 is plotted for a typical measurement. It extends eccentrically from the center of a side 24 to an opposite corner 25 of the square fiber core 21.

The result of the IM-FTS measurement for the scan line 23 is shown in FIG. 3. On the y-axis the refractive index difference $\Delta n$ is plotted with respect to undoped quartz glass, and the position P along the scan line 23 is shown in µm on the x-axis. In the area of the fiber core 21, the refractive index difference is $\Delta n=0$. The refractive index profile shows that the refractive index of the fluorine-doped quartz glass which is deposited on the flat side 24 of the fiber jacket 22 (designated as 22/24) is more strongly reduced ($\Delta n=17.3\times10^{-3}$) than the refractive index of the fluorine-doped quartz glass which was deposited near the corner 25 of the fiber jacket 22 (designated as 22/25) ($\Delta n=13.8\times10^{-3}$). This is due to the higher surface temperature in the deposition process in the area of the core rod corner 25.

To avoid this effect, the fluorine-doped cladding glass according to the invention is produced in a multi-stage deposition process which will be explained in more detail hereinafter with reference to FIGS. 4 to 6 by way of the example of the coating of a core rod with 4D-shaped cross-sectional area.

In the radial cross-section shown in FIG. 4, the core rod 41 of undoped quartz glass has four sides (filling-up surfaces 42) that are opposite each other in pairs and are more or less flat and connected via four round corners 43. The cross section exhibits a fourfold symmetry around the longitudinal axis of the core rod. All edges are positioned on an enveloping circle

48 around the cross section of the core rod 41. In the embodiment, it has four support points at the round corners 43. As a rule, the enveloping circle is understood to be the circle which completely envelopes the core rod cross-section with the smallest diameter possible.

On the core rod 41 which is rotating about its longitudinal axis, a surrounding closed cladding-glass layer 44 of fluorine-doped quartz glass is produced on the basis of a standard POD process. The elevated temperature during deposition in the area of the corners 43 leads to a lower fluorine doping at that place and thus to a smaller refractive-index decrease than in the area of the filling-up surface 42, as has explained above with reference to FIGS. 2 and 3. FIG. 4 schematically shows the higher fluorine-doped regions 45 with a strong refractive-index decrease in dark gray color and the regions 46 with reduced fluorine incorporation and lower refractive-index decrease in a light gray color.

The POD process parameters are here adjusted such that in the regions 45 deposited on the flat sides 42 one obtains a fluorine concentration which effects a refractive index decrease of $\Delta n=17.3\times10^{-3}$; this is the fluorine nominal concentration.

The POD process is continued until the thickness of the built-up cladding glass layer 44 in the regions 45 having the fluorine nominal concentration is at least so great that the enveloping circle 48 is completely filled up. In other words, the deposition process will be terminated as soon as so much cladding glass mass with the fluorine nominal concentration has deposited on the filling-up surfaces 42 of the core rod profile that this mass completely fills up the region between core rod 41 and its enveloping circle 48.

In the second step, the outside geometry of the blank obtained thereby is mechanically ground to be round, namely such that the end diameter after the grinding process corresponds to the enveloping circle diameter. FIG. 5 shows the semifinished product 51 obtained thereby in cross section. This cross section is circular and round, the filling-up surfaces 42 of the 4D-shaped core rod 41 being occupied by circle segments 47 of fluorine-doped quartz glass which make up a first part of the final POD cladding glass layer and which form a POD filling layer in the sense of the invention. It is important that the cladding-glass circle segments 47 of quartz glass which remain after grinding have approximately the fluorine nominal concentration and that they jointly form a round total cross-section on the profile of the core rod 41.

The round total cross-section is a precondition for achieving a homogeneous loading of the quartz glass with fluorine in the third step in which the semifinished product 51 is further coated with fluorine-doped quartz glass in a POD process, for due to the roundness in the cross section one achieves a uniform temperature during the deposition process, so that an azimuthally uniform refractive index is achieved in the newly built-up POD enveloping glass layer 49 with circular round cross-section. The boundary surface between the cladding glass circle segments 47 and the enveloping glass layer 49 shows the good quality as is achievable in POD processes in a standard way.

The preform 50 produced in this manner is schematically shown in FIG. 6. The preform 50 comprises two cladding glass regions produced in different POD processes, namely the POD filling layer (circle segments 47) and the POD enveloping glass layer 49. The refractive index of the POD enveloping glass layer 49 is adapted as exactly as possible to the refractive index of the glass of the circle segments 47, which requires a fluorine loading according to the fluorine nominal concentration. However, the refractive index of the POD enveloping glass layer 49 can also be set to be lower or higher relative to the glass of the POD filling layer 47, wherein the first-mentioned case is normally advantageous. In the case of identical dopant concentrations a boundary surface cannot be detected. The dotted line just indicates the previous enveloping circle 48.

A suitable device for producing the cladding glass layer 44 and the POD enveloping glass layer 49 with respectively circular round cross-section is schematically shown in FIG. 1. For the deposition of the POD enveloping glass layer 49 the semifinished product 51 is coated in a deposition chamber 1 by way of a POD process with fluorine-doped quartz glass. The semifinished product 51 is held with a horizontally oriented longitudinal axis 4 by means of holding tubes 5, which are welded onto the face, in the jaws of a glass lathe (not shown). With the help of the glass lathe the semifinished product 51 is rotatable not only about its longitudinal axis 4, but can also be reversingly moved back and forth along the longitudinal axis 4.

$SiCl_4$, oxygen and $SF_6$ are supplied to the plasma burner 6 as start substances and are converted in the plasma flame 7 into $SiO_2$ particles. The plasma flame 7 is produced within a burner tube 10 of quartz glass which is surrounded by a high-frequency coil. At the beginning of the deposition process a distance of 120 mm is set between the burner tube 10 and the longitudinal axis of the semifinished product 51.

The semifinished product 51 which is rotating about its longitudinal axis 4 is reversingly moved back and forth between the turning points A, B along the plasma burner 6, as illustrated by the directional arrow 14. $SiO_2$ particles are deposited layer by layer on the outer cylinder surface which is of a circular round cross-section. Each deposited layer is vitrified by means of the plasma flame 7 directly into the fluorine-containing quartz glass of the cladding glass layer 49.

A modification of the above-explained method is different in the first method step, i.e. the POD build-up of the cladding glass on the filling-up surfaces 42 of the core rod 41. Here, a surrounding closed cladding-glass layer 44 is not formed, but only the filling-up surfaces 42 are coated with cladding glass. To this end the core rod 41 is further rotated to the next filling-up surface 42 to be coated after each coating stroke for filling up a filling-up surface 42. The building up of the cladding glass will be continued until the core rod regions to be filled up are adequately filled up with fluorine-doped quartz glass with the fluorine nominal concentration so as to obtain the semifinished product 51 by subsequent round grinding as in FIG. 4 b). Subsequently, it will be further processed into the preform 50, as has been explained above.

A preform with a non-round core rod and a POD cladding glass layer with a homogeneous refractive-index profile is desired for many fiber applications because the coupling-in and irradiation characteristics of the fiber are thereby improved and the numerical aperture (NA) of the fiber becomes more homogeneous azimuthally. Owing to the 4D-shaped cross section differing from the circle form, helix modes are hindered and changed, which permits a more efficient injection of pump light into the laser active core in the case of laser applications.

FIGS. 7 to 10 show cross sections of further optical preforms which are advantageously producible with the help of the method according to the invention, i.e. without bubbles and with homogeneous and defined fluorine doping in the respective filling layer 77, 87, 97, 107 and in the enveloping glass layer 49. In all embodiments a POD cladding glass layer which is composed of a filling layer 77, 87, 97, 107 and of a POD enveloping glass layer 49 deposited thereon with round circular cross-section is produced on a core with non-round cross-section of undoped quartz glass and six-fold symmetry with the help of the above-explained two-stage method. The differences between the illustrated embodiments only reside in the geometry of the respective core and in the geometry and fluorine content of the associated filling layer 77, 87, 97, 107.

FIG. 7 shows a core rod 71 with an outer jacket which is provided with flat longitudinal grooves with rounded-off bottom of a concave curvature. The rounded portions on the bottom of the grooves have the same radius of curvature (only with different sign) as the convexly curved surface sections 72 of the core rod 71 between the longitudinal grooves on which the support points 43 of the enveloping circle 48 are located. Therefore, viewed in cross section, the filling glass layers 77 have an elliptical form, except for the pointed edges.

Figure 8:
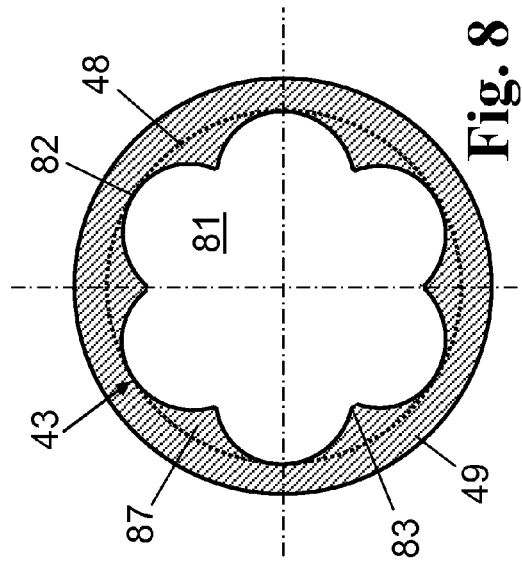

FIG. 8 shows a core rod 81 with blossom-shaped cross-section with an outer jacket which is provided with grooves the wall of which converges in a convex curvature downwards into a tip 83. Neighboring grooves seamlessly converge into one another, so that, except for the tips 83, the whole surface of the core rod 81 is convexly curved so as to form outside curvatures 82. The support points 43 of the enveloping circle 48 are here positioned on the outside curvatures 82. The respective filling glass layers 87 are separated from one another, as is also shown in all other embodiments according to FIGS. 6 to 10.

Figure 9:
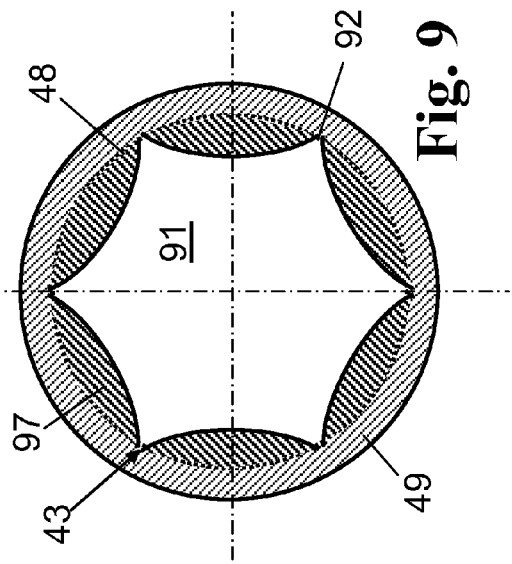

FIG. 9 shows a similar cross-sectional profile as FIG. 7. The core rod 91 has a star-shaped cross-section in this case. This cross-section is formed in that the outer jacket is provided, starting from star tips 92, with adjoining flat and rounded-off indentations of a concave curvature. The rounded portions of the indentations have the same radius of curvature (only with different sign) as the enveloping circle 48, so that the filling glass layers 97 in cross section are similar to an ellipse (except for their two pointed edges). The fluorine content of the filling glass layers 97 is here higher than that of the enveloping glass layer 49. The star tips 92 form the support points 43 of the enveloping circle. Apart from these, the whole surface of the core rod 91 is concavely curved.

Figure 10:
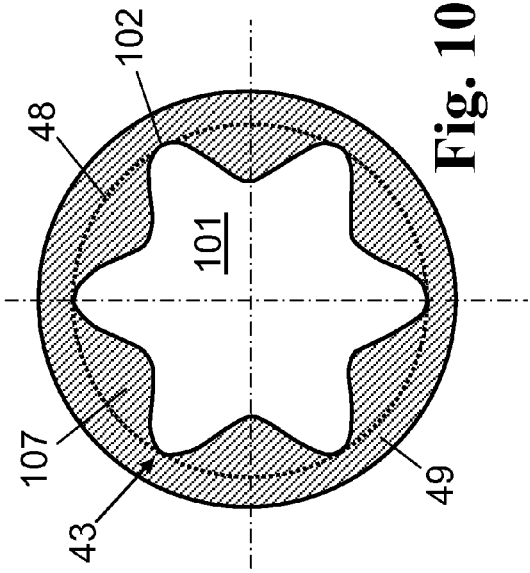

FIG. 10 shows a similar cross-sectional profile as FIG. 8. The core rod 101 has a wave-shaped cross-sectional profile in which hills 102 and valleys are alternating. The valleys are formed by longitudinal grooves provided in the outer jacket of the core rod 101, which in the valley bottom have a concave curvature and otherwise a convex curvature. The hills 102 form the support points 43 of the enveloping circle 48. The respective filling glass layers 107 are separated from one another.

The invention claimed is:

1. A method for producing an optical preform with a POD cladding glass layer of fluorine-doped quartz glass, said method comprising:
   forming $SiO_2$ particles with a plasma burner in the presence of fluorine,
   depositing said $SiO_2$ particles on an outer cylinder surface of a cylindrical substrate body having a longitudinal axis, and
   vitrifying said particles directly,
   said substrate body having a non-round cross-section taken perpendicular to the longitudinal axis including at least one surface section that extends between support points of an enveloping circle of said cross-section and that either has no curvature or has a curvature that is different from the curvature of the enveloping circle,
   wherein the forming, depositing and vitrifying steps include:
   (a) producing a POD filling layer of quartz glass with fluorine in a nominal concentration on said surface section, so as to form a coated substrate body, said coated substrate body having a circular cross-section having a radius that is at least as great as a radius of the enveloping circle; and
   (b) depositing a POD enveloping glass layer having a of circular cross-section, said POD enveloping glass layer being of fluorine-doped quartz glass on the coated substrate body.

2. The method according to claim 1, wherein the producing of the POD filling layer on the surface section comprises:
   (aa) depositing a POD precursor layer of the quartz glass with the nominal concentration of fluorine on the surface section;
   (bb) removing the portions of the POD precursor layer projecting over the enveloping circle so as to form the coated substrate body with circular cross-section.

3. The method according to claim 2, wherein during depositing of the POD precursor layer the substrate body is continuously rotated about the longitudinal axis to deposit a surrounding POD precursor layer annularly enclosing a cylinder jacket of the substrate body.

4. The method according to claim 2, wherein the depositing of the POD precursor layer is exclusively or predominantly carried out on the surface section.

5. The method according to claim 2, wherein all of the portions of the POD precursor layer that are projecting over the enveloping circle are removed.

6. The method according to claim 1, wherein a substrate body is used that, viewed in the direction of its longitudinal axis, has a polygonal cross-section.

7. The method according to claim 6, wherein all corners of the polygon are located on the enveloping circle.

8. The method according to claim 1, wherein the substrate body, viewed in the direction of the longitudinal axis, comprises at least a portion with D-shaped cross-section.

9. The method according to claim 1, wherein a substrate body is used that, viewed in the direction of the longitudinal axis, has a square, rectangular, hexagonal or octagonal cross-section.

* * * * *